No. 607,474. Patented July 19, 1898.
F. H. RICHARDS.
WEIGHING MACHINE.
(Application filed June 23, 1897.)

(No Model.) 8 Sheets—Sheet 1.

Fig. 1.

Witnesses:
R. W. Pittman
C. P. Reed

Inventor
F. H. Richards

No. 607,474. Patented July 19, 1898.
F. H. RICHARDS.
WEIGHING MACHINE.
(Application filed June 23, 1897.)
(No Model.) 8 Sheets—Sheet 2.

Fig. 2

Witnesses
R. W. Pittman
C. P. Heed

Inventor
F. H. Richards

No. 607,474. Patented July 19, 1898.
F. H. RICHARDS.
WEIGHING MACHINE.
(Application filed June 23, 1897.)
(No Model.) 8 Sheets—Sheet 3.

Fig. 3

Witnesses: R. W. Pittman, C. S. Reed.

Inventor: F. H. Richards

No. 607,474. Patented July 19, 1898.
F. H. RICHARDS.
WEIGHING MACHINE.
(Application filed June 23, 1897.)
(No Model.) 8 Sheets—Sheet 4.

Fig. 4.

Witnesses
R. W. Pittman
C. H. Reed

Inventor
F. H. Richards

No. 607,474. Patented July 19, 1898.
F. H. RICHARDS.
WEIGHING MACHINE.
(Application filed June 23, 1897.)
(No Model.) 8 Sheets—Sheet 5.

Fig. 5.

Witnesses:
R. W. Pittman
C. H. Heed

Inventor
F. H. Richards

No. 607,474. Patented July 19, 1898.
F. H. RICHARDS.
WEIGHING MACHINE.
(Application filed June 23, 1897.)

(No Model.) 8 Sheets—Sheet 6.

Fig. 6.

Witnesses
R. W. Pittman
C. H. Reed

Inventor
F. H. Richards

No. 607,474. Patented July 19, 1898.
F. H. RICHARDS.
WEIGHING MACHINE.
(Application filed June 23, 1897.)
(No Model.) 8 Sheets—Sheet 7.

Fig 7.

Witnesses:
R. W. Pittman
C. H. Reed

Inventor
F. H. Richards

No. 607,474. Patented July 19, 1898.
F. H. RICHARDS.
WEIGHING MACHINE.
(Application filed June 23, 1897.)
(No Model.) 8 Sheets—Sheet 8.

Witnesses:
R. W. Pittman
C. J. Reed

Inventor
F. H. Richards.

THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,474, dated July 19, 1898.

Application filed June 23, 1897. Serial No. 641,863. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object thereof being to provide an improved weighing apparatus comprehending, among other improvements, improved material-supply mechanism, improved beam mechanism for supporting a load-receiver and embodying a traveling or shiftable weight, regulator mechanism, and compound tripping mechanism operatively connected with the material-supply and regulator mechanisms and operated from the one independently of the other to operate in connection with the beam mechanism, thereby to effect the discharge of the load.

In the drawings accompanying and forming part of this specification.

Similar characters of reference designate like parts in all the figures of the drawings.

In a general way this weighing-machine comprises improved material-supply means, whereby simultaneously with the complete cutting off of the stream of material by suitable cut-off means said stream is also reduced, and which material-supply means comprises, in the form of apparatus herein shown and described, a supply-chute having a plurality of stream deflector or break walls above the discharge mouth or outlet of said chute and a multiplicity of stream-controllers or valves, one operable completely to cut off the stream of material and a plurality thereof operable simultaneously with such cut-off valve to reduce said stream; improved pivotally-supported beam mechanism carrying a load-receiver and embodying a shiftable or traveling weight operatively connected with said receiver, whereby such weight is shiftable toward and from the beam-axis to assist or effect one part of the movement of said load-receiver; material-exit operated or regulator mechanism, and connections intermediate the beam mechanism and material-supply and regulator mechanisms, whereby on the closing of the cut-off valve simultaneously with the poising of the load-receiver such receiver will be permitted to move into position to discharge its load, and whereby the load-receiver will be permitted to receive a second load, but the discharge thereof be prevented until all appreciable amount of material has passed by the regulator mechanism.

As a preface to a further description of this improved weighing-machine, it will be understood that various parts of the same could be more or less modified without departing from the general scope of the invention.

This improved weighing machine or apparatus comprehends, in the preferred form thereof herein shown and described, material-supply means (designated in a general way by A) comprising a supply-chute and stream-controlling means, such as valve mechanism; beam mechanism (designated in a general way by B) embodying traveling or shiftable counterbalancing means; an upsettable or oscillatory load-receiver (designated in a general way by C) supported by said beam mechanism and operatively connected with said counterbalancing means, whereby on the traveling movement of the counterbalancing means toward and from the beam-axis, thereby to vary its efficiency, the oscillation of said load-receiver will be effected; material-exit-operated means, such as regulator mechanism, (designated in a general way by D;) compound tripping mechanism (designated in a general way by E) operatively connected with the valve mechanism and with the regulator mechanism and operative from the one independently of the other to operate in connection with the beam mechanism, thereby to effect the discharge of the load; locking means (designated in a general way by F) for locking the valve closed during the discharge of the load-receiver and for locking the receiver against movement while the valve is open and which for the purposes of this specification will be designated as "duplex" locking means or mechanism, and locking means (designated in a general way by G) for locking the receiver in its discharging position, and which locking means is shown operative through the medium of the regulator mechanism.

The framework for carrying the operative parts of the machine may be of any suitable construction, but is herein shown comprising a base 2, constructed to have the forward part thereof constitute the front and side walls of a bin 3, which communicates with a material-discharge conduit 4 and into which bin the material discharged from the load-receiver is emptied, one of the walls, shown herein as the rear wall, of such bin being formed by the regulator in the manner hereinafter set forth. Extending upward from this base 2 is a pair of uprights or side frames 5 and 6, having secured thereto a top plate 7, adapted to support the material-supply means hereinafter described.

The beam mechanism, (designated generally by B,) in the preferred form thereof herein shown and described, comprehends a scale-beam 100, comprising a yoke-shaped member 8 and a rearwardly-extending weight-supporting arm, herein shown carried at one side of the yoke-shaped member. This beam 100 is supported for oscillatory movement by suitable bearings, one part thereof carried by the beam and the other part thereof by the framework. These bearings are herein shown in the nature of V-shaped bearings, the knife-edge pivot members thereof 10 and 10' being carried by said side frames, while the V-shaped bearing members 12 and 12' thereof are carried by the beam. The rearwardly-extending weight-supporting arm 9 is shown herein in the nature of a track 13 for the reception of a traveling weight 150, which constitutes the load or counterbalancing weight for the load-receiver. This weight in its preferred form shown, which, together with the other weights of the machine, it will be understood, will be experimentally determined in the first instance in order to secure the proper action of the operative mechanisms, is provided with an opening 14, extending through the same for the reception of the weight-arm 9. The upper and under walls at each end of this opening 14 are recessed for the reception of a series of grooved track rolls or wheels 15, the axles of which project into the side walls of the opening, whereby by means of the track and track-wheels the load-weight is shiftable toward and from the beam-axis. Fixedly but adjustably secured to the outer end of the weight-arm 9 is a member in the nature of a post or bar 16, constituting a stop for the weight. This post is provided at its upper end with a projection 17, forming one member of the weight locking or latching means. Secured to the weight is the other member of this locking means and which is shown herein as a shiftable member in the nature of a latch 18, pivotally secured intermediate projections or ears 19 at the upper side of the weight. This latch is provided with a hook 20, adapted to engage the projection 17 of the stop, whereby said weight when the hook is in engagement with said projection is prevented from movement toward the beam pivots or axis. To prevent jar and shock of the weight when returning to its normal position, the framework is shown provided with a rearwardly-extending arm or bracket 21, having a pair of lugs 22 for the reception of a buffer, shown herein as a headed rod 23, mounted in said lugs and maintained in position by a nut 24. A suitable spring 25 is interposed intermediate the lower lug and a shoulder 26 of said rod when in its depressed position, whereby said buffer is held in position to receive the stop 16 of the weight-arm on the return of the counterbalance-weight to its normal position.

Supported by the beam mechanism is suitable hanger mechanism adapted to support the load-receiver and which hanger mechanism, in the preferred form thereof, comprises a pair of hangers 30 and 31, shown herein pivotally connected at their upper ends by links or levers 32 to the supply-chute. Stops 30' and 31' are shown projecting from the side of the supply-chute for limiting the movement of the hangers and thereby the descending movement of the load-receptacle. Suitable bearings are provided between the beam mechanism and hangers, and in the form shown these bearings comprise knife-edge pivots carried by the beam mechanism and V-shaped bearing members carried by the hangers, whereby said hangers are movable with the beam mechanism.

The load-receiver (designated generally by C) may be of any suitable construction; but in the preferred form thereof herein shown and described it comprises a receptacle or bucket 200, preferably of the single-chambered type or class, supported intermediate the arms of the yoke-shaped member 8 of the beam and also of the hangers, being pivotally secured to said hangers adjacent to the lower ends thereof, whereby it is upsettable or oscillatory to discharge its load. This receptacle is herein shown so pivotally disposed intermediate the hangers that a preponderance of its load will be forward of the pivotal or axial point of said receptacle, whereby when the valve-receptacle-locking means hereinafter described is unlocked and the weight-latch tripped such receptacle will be quickly oscillated by the load therein and assisted by the traveling weight into its load-discharging position.

The counterbalancing-weight 150 is operatively connected with the load-receptacle 200, whereby it is shiftable toward and from the beam-axis, thereby to vary its efficiency and to effect the oscillation of said load-receiver, and for this purpose a suitable connector, shown herein in the nature of a lever 35, is pivotally secured to the weight intermediate a pair of ears or projections 36 and to the load-receptacle at one side thereof, as at 36'. This pivotal point 36' of the connector with the receptacle is coincident with the pivotal points 37 of the hanger mechanism with the beam, whereby the receptacle during its reciprocatory or poising movements has no tendency to shift the load-weight 150 on its track.

For returning the receptacle to its normal position after the discharge of the load a suitable weight 39 is shown carried thereby in such position that it will quickly and readily accomplish this result.

Figure 1:
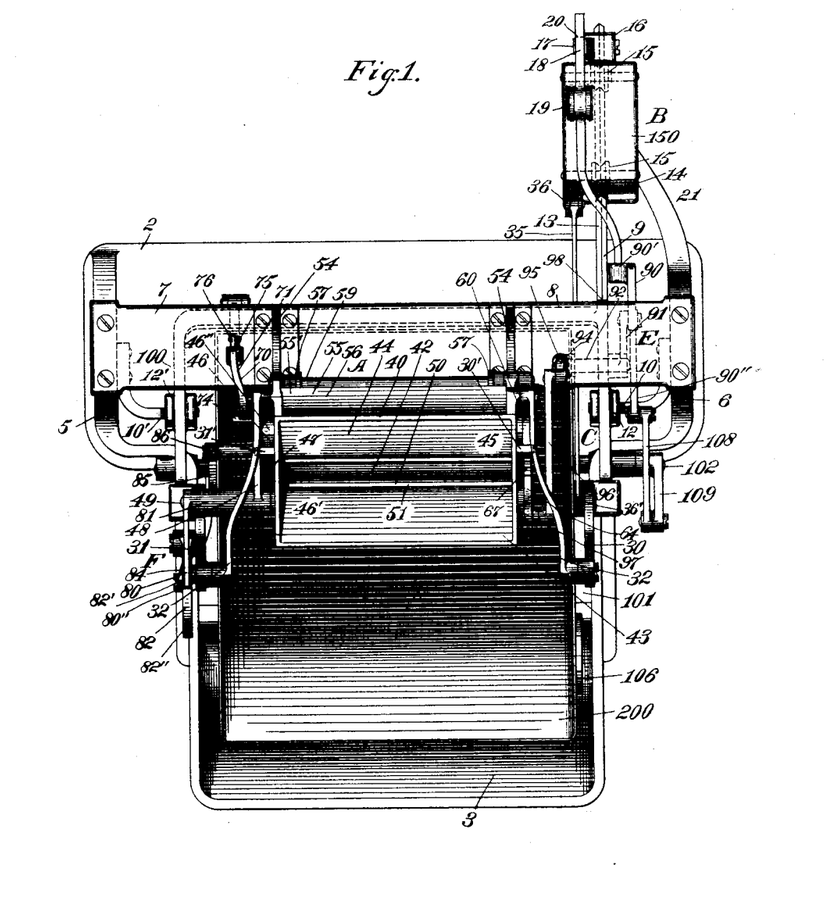
Figure 1 is a top view of this improved weighing-machine.
Figure 2:
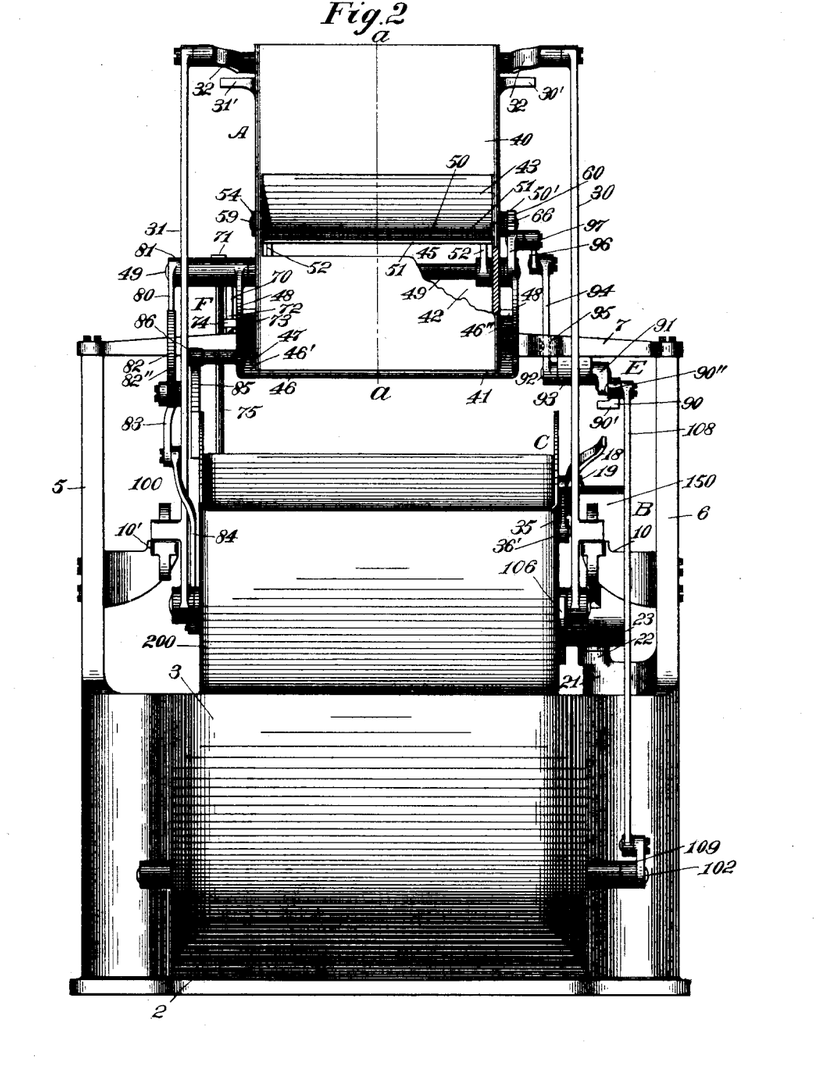
Fig. 2 is a front view thereof with a part of the supply-chute broken away.
Figure 3:
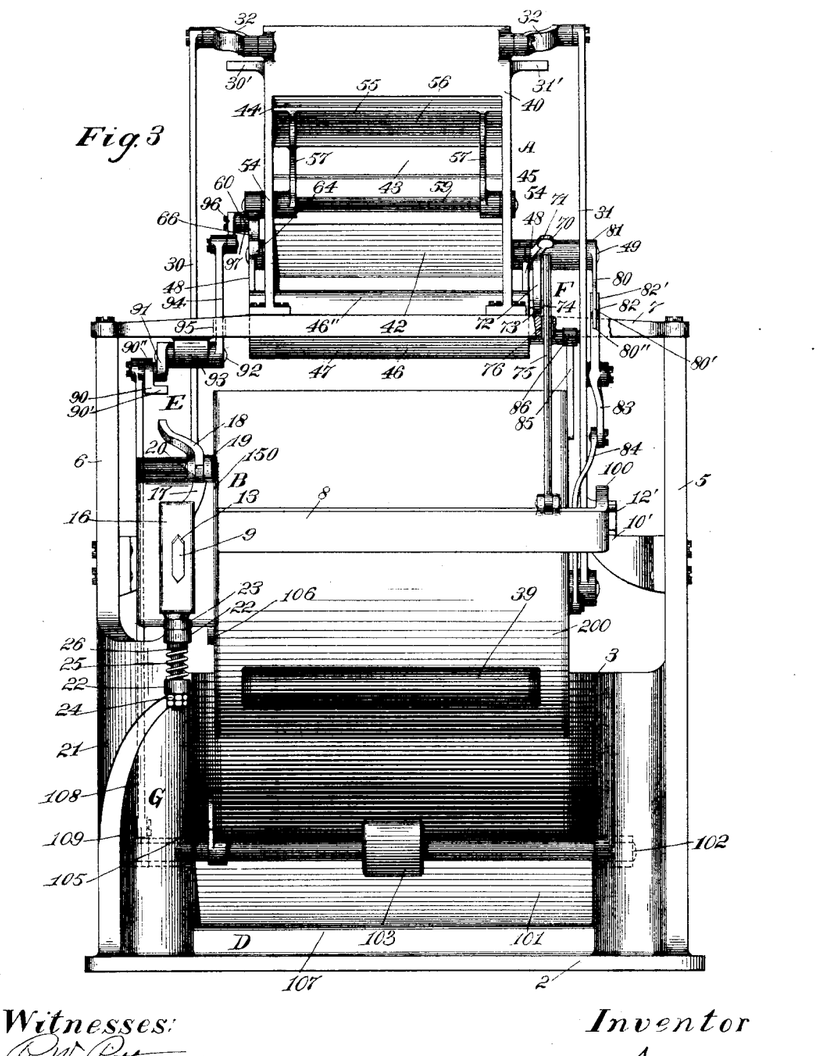
Fig. 3 is a rear view of said weighing-machine.
Figure 4:
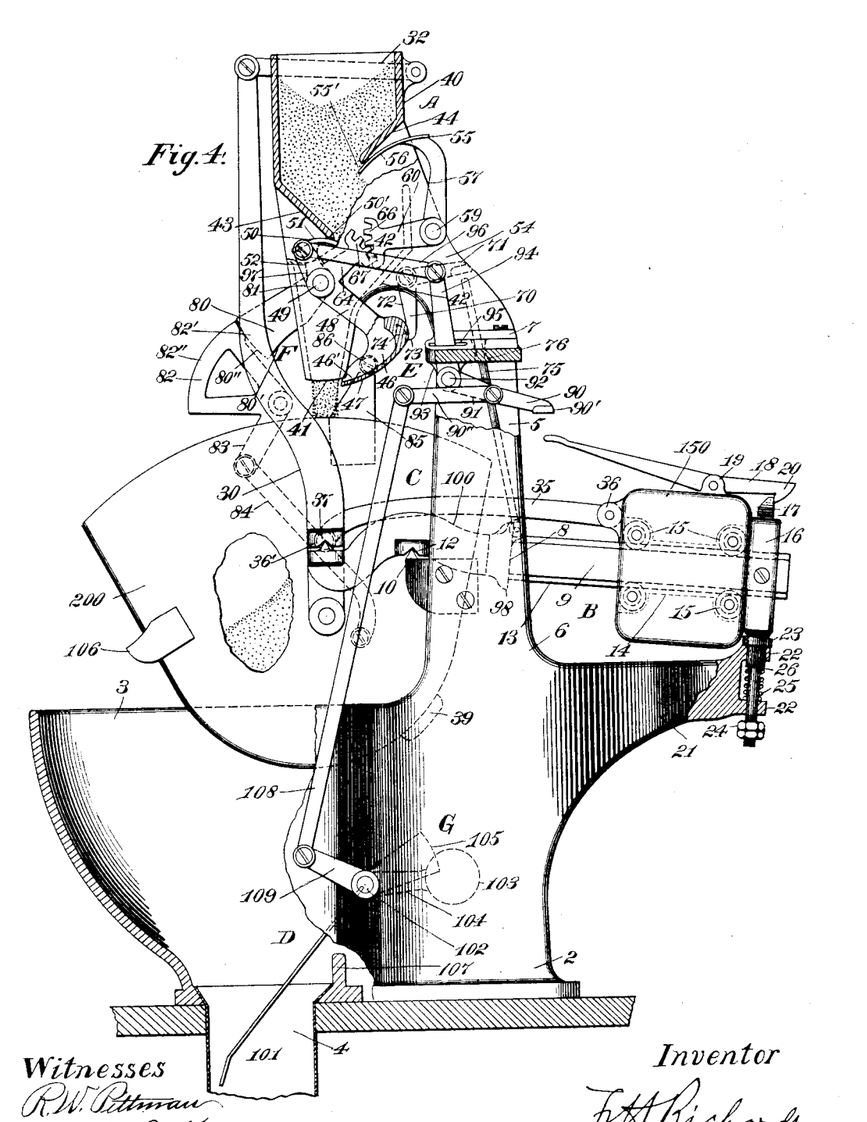
Figs. 4, 5, and 6 are side elevations of the apparatus, showing various positions of the operating mechanisms during the weighing of a load, parts of the machine being illustrated in dotted lines and in section.
Figure 5:
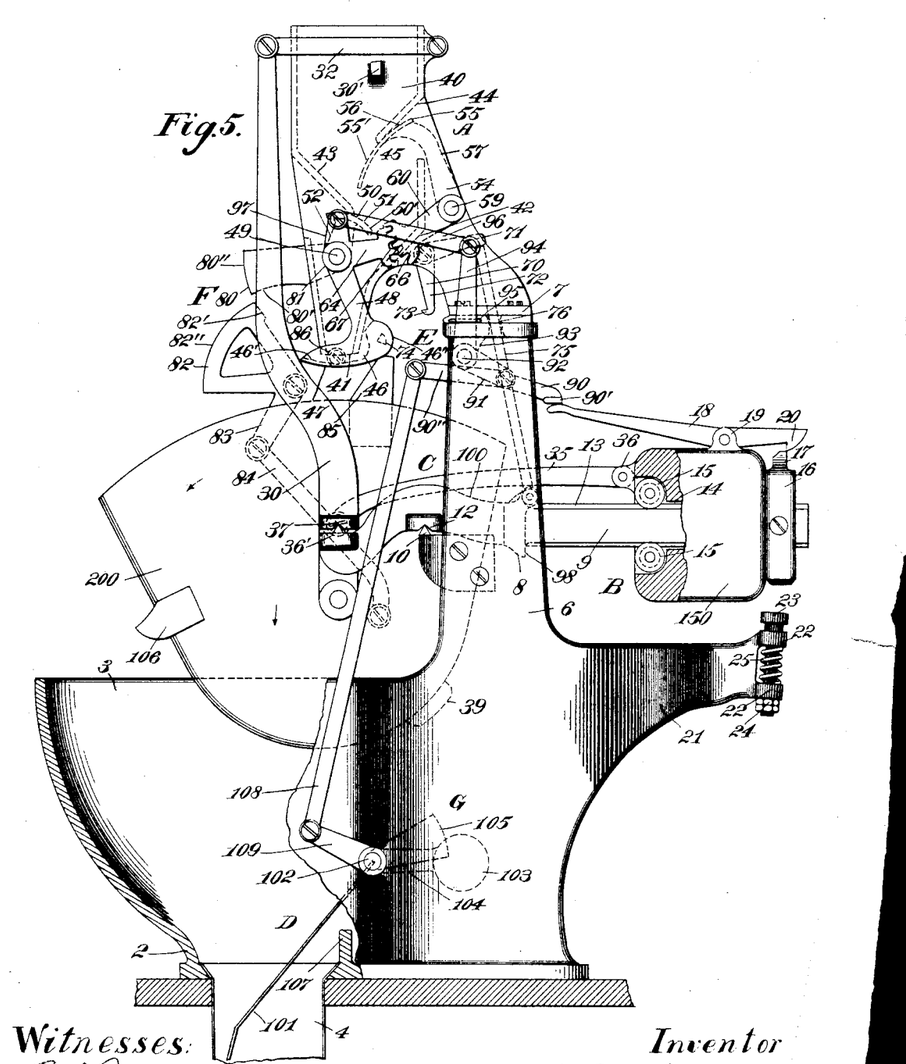
Figure 6:
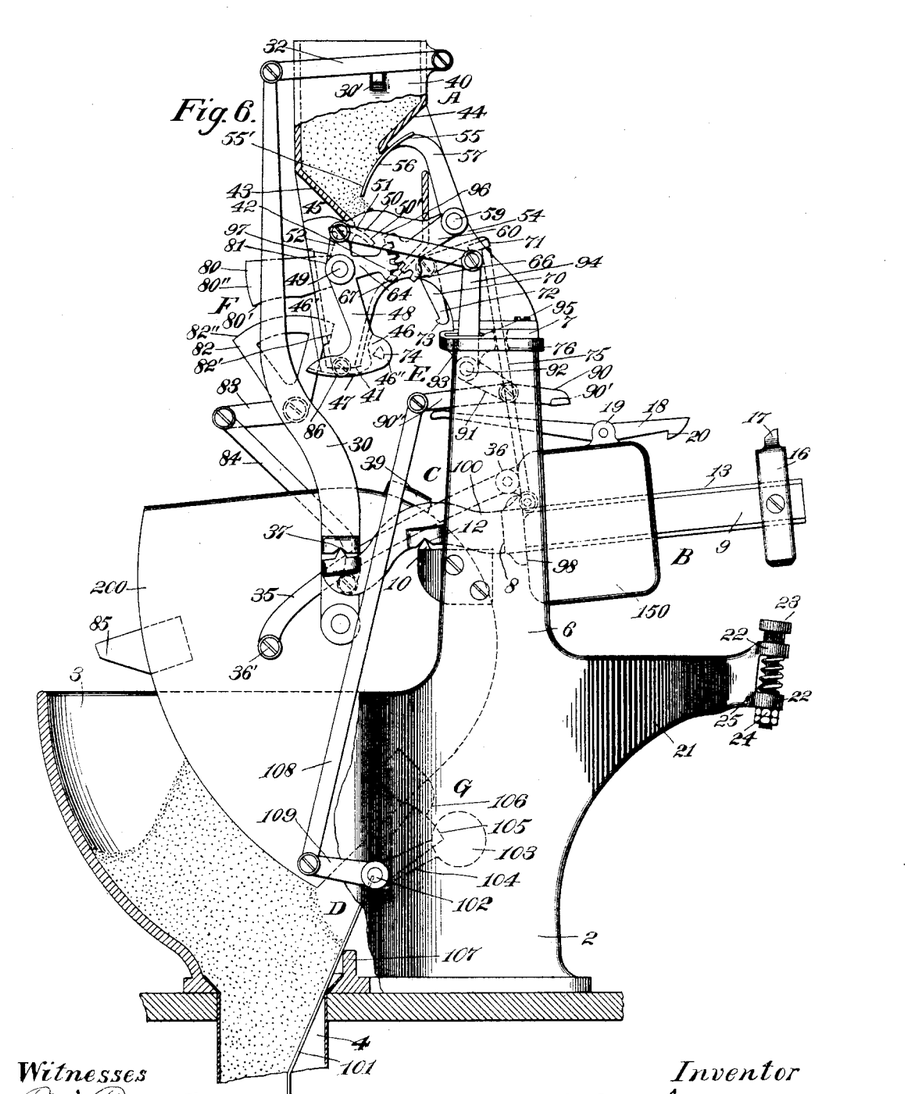
Figure 7:
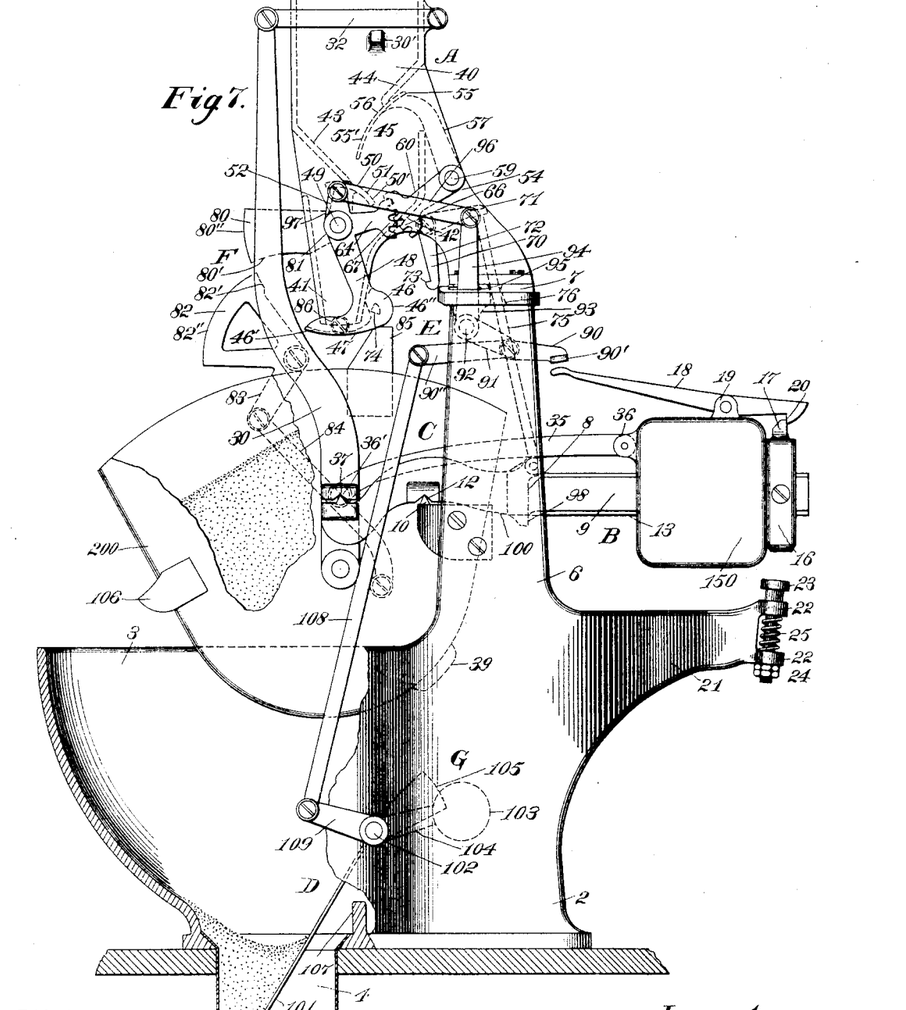
Fig. 7 is also a side elevation, partly in section, of the machine and illustrates the same as having received a second load, but the discharge thereof prevented until all appreciable amount of material has passed the regulator mechanism. The above-described figures also illustrate one form of connection intermediate the valves forming part of the material-supply means.
Figure 8:
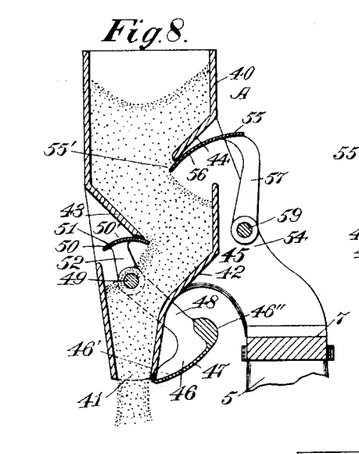
Figs. 8 and 9 are sectional views of the material-supply means, taken in line *a a*, Fig. 2, and illustrate the supply-valves in their different material-regulating positions.
Figure 9:
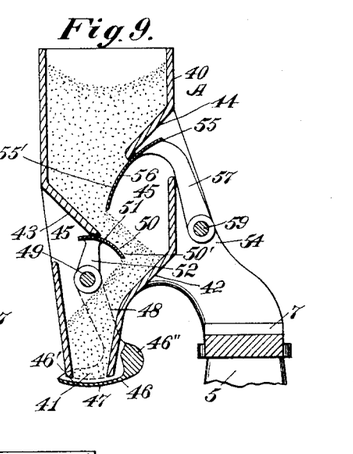

From the foregoing it will be seen that the counterweight, being supported to have a traveling movement upon the beam toward and from the beam-axis, gives to the weight its efficiency at the successive positions of the load-receptacle—that is to say, when the load-receptacle is in its load-receiving position the weight is locked in its position of greatest efficiency and operates as the load-weight. When the receptacle moves to its discharging position, said weight is drawn toward the beam-axis, so as to have less efficiency for counterbalancing the loaded receptacle. The result of this organization is that when the load-weight is shifted to its position of inefficiency the relatively small amount of material bearing upon the under edge of the load-receptacle (this being in its discharge position shown in Fig. 6) will serve to retain the load-receptacle in such position and so prevent the return movement of the receptacle until the load has been nearly discharged. In practice before this period arrives the material will accumulate against the regulator and in the manner hereinafter set forth effectually lock the receptacle in its load-discharging position.

The material-supply mechanism, (designated generally by A,) in the preferred form thereof herein shown and described, comprises a suitable supply-chute 40, supported by the top plate 7, and has the usual discharge-mouth 41. Above this mouth the chute is provided with a multiplicity of stream deflector or break walls, shown herein as three in number, 42, 43, and 44, each of which projects inwardly at an angle to the perpendicular wall of the chute, whereby the shock or jar caused by the impact of the supply-stream on its downward passage is received by the break-walls and the cut-off valve consequently protected from the force thereof.

For the purpose of regulating the supply of material to the load-receiver, thereby to cut off the same at the proper predetermined period, improved stream-controlling or material-cut-off means is provided, which, in the preferred form thereof herein shown and described, comprises valve mechanism 45, carried in position to accomplish this purpose. This valve mechanism 45 comprises a plurality or multiplicity of valves disposed one above another and shown herein operable simultaneously to reduce and cut off the supply of material. In the structure shown this valve mechanism comprises a series of three valves, two of which are herein designated as "reducing" valves, each disposed adjacent to one of the stream-break walls, while the other is herein designated as the "cut-off" valve, and disposed to have its valve-plate shiftable below the discharge-mouth 41 of the chute.

In the present construction the cut-off valve 46, which is shown as an oscillatory or swinging valve, preferably comprises a concaved valve plate or blade 47, carried by a pair of valve-arms 48, one at each end of said plate, and which arms are fixedly secured at the outer sides of the chute to a rock-shaft 49, journaled in the sides of said chute, whereby the valve-plate 47 is in position for shiftable movement below the discharge-mouth of the chute, thereby to cut off the supply-stream.

Adjacent to and below the stream-break wall 43 one of the reducing-valves, as 50, is disposed, and which in the form shown preferably comprises a convexed valve plate or blade 51, having a pair of valve-arms 52, one at each end thereof, and which arms are secured to the rock-shaft 49 at the inner sides of the chute, whereby said reducing-valve and cut-off valve are operable synchronously, one to reduce the stream adjacent to the stream-break wall 43 and the other to cut off the stream to the load-receiver. The other reducing-valve 55 of the series is likewise shown as a convexed valve plate or blade 56, disposed above the first reducing-valve 50 and provided with a pair of valve-arms 57, one at each end thereof, and which arms are shown herein secured to a second rock-shaft 59, journaled in the chute-support 54 and in the rear of the chute proper, but in such position that the valve-plate 56 will be in position adjacent to the upper stream-break wall 44 to also reduce the supply-stream. In the present construction the reducing-valves are so disposed relatively to the break-walls that they form with their curved or working faces continuations of such walls when the valves are in their stream-reducing positions.

From the foregoing it will be seen that the reducing-valves are oppositely disposed relatively to each other, one operating from the rear of the chute, while the other operates from the front thereof, with a stream-break wall between the same, and that the valve-blades of the reducing-valves are disposed in opposition to the cut-off valve—that is to say, the convex faces 50' and 55' of the reducing-valves constitute the stream-receiving faces, while the concave face 46' of the cut-off valve constitutes its stream-receiving face—and that the said valves are disposed one above another, whereby the reducing-valves operate to reduce the stream to the cut-off valve at the proper predetermined period, and thus prevent the weight of a large supply-stream from resting on the cut-off valve, and consequently permitting its quick and easy opening and closing movements.

It will also be seen from the foregoing that the reducing-valve 50 being connected with the rock-shaft 49, carrying the cut-off valve 46, such valves will operate together, one to reduce while the other cuts off the supply of the material.

Figure 10:
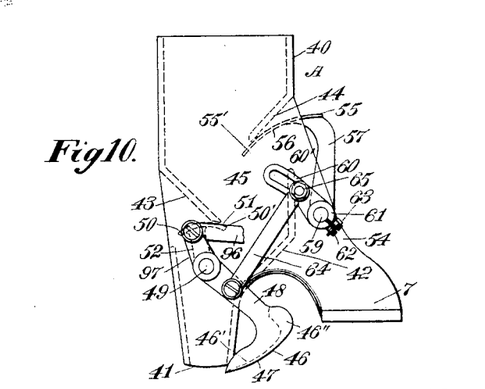
Fig. 10 is a view of another form of connecting mechanism intermediate the supply-valves.
Figure 11:
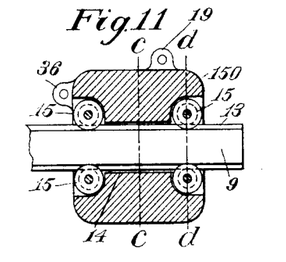
Fig. 11 is a sectional view of the traveling or shiftable beam-weight and a part of its supporting-arm.
Figure 12:
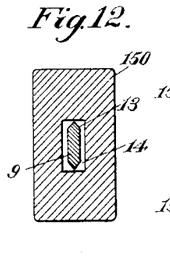
Fig. 12 is a cross-sectional view thereof, taken in line *c c*, Fig. 11.
Figure 13:
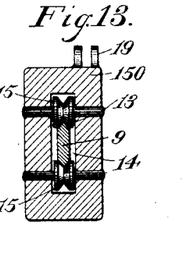
Fig. 13 is also a cross-sectional view of such weight, taken in line *d d*, Fig. 11.

In order to secure the operation of the reducing-valve 55 simultaneously with its companion reducing-valve 50 and also with the cut-off valve 46, suitable connecting mechanism is shown intermediate such reducing-valve and the other valves of the series, and in the preferred form thereof herein shown and described, Fig. 10, this connecting means comprises a pair of connectors, one of which is shown herein as a slotted link or lever 60 so secured to the valve rock-shaft 59, which for this purpose is shown projecting from the outside of the chute, as to permit adjustment of the valve relatively to said link. To secure this adjustment of the valve, the link is provided with a split hub or sleeve 61, having projecting ears 62, through which an adjustable clamping device 63 extends. The other connector comprises a lever 64, pivotally secured to one of the valve-arms 48 of the cut-off valve and adjustably secured by a suitable clamping device 65 to the slotted part of the connector 60, whereby it is adjustable relatively to the slot 60' thereof. Owing to this adjustable connecting means intermediate the cut-off valve and the reducing-valve, it will be seen that not only can the size of the stream be regulated when such reducing-valve is open, but that such supply-stream can either be partially or completely cut off when the cut-off valve is in its closed position, as by adjusting the valve-arms 57, and thereby the valve 55, toward or from the slotted connector 60 the position of such reducing-valve can be regulated, whereby when it is in its open position the valve-blade will project by the inner end of the stream-directing wall 44 to a greater or less extent proportionate to its adjustment and the size or volume of the supply-stream thus determined, and by adjusting the connector 64 relatively to the slot 60' the throw of said valve is regulated thereby to increase or decrease the movement of such valve, whereby said combined adjustments will enable a partial or complete cutting off of the supply-stream at a point above the cut-off valve when the reducing-valve 55 closes in a manner that will be readily understood without a more detailed description. In another form of this improved connecting means, Figs. 1 to 7, each of the connectors 60 and 64 is shown provided with a rack or tooth segment 66 and 67 in mesh with each other, the connector 64 in this instance being secured to the cut-off valve 46 at the hub thereof. By means of this connecting means it will be seen that when the cut-off valve closes or opens the reducing-valve 55, owing to the intermeshing teeth, will likewise close or open.

In order to lock the cut-off valve 46 open, and thereby the reducing-valves, during the loading period of the receptacle, suitable locking mechanism is provided, which, in the preferred form thereof herein shown and described, comprises a locker 70, pivotally secured in this instance to one side of the supply-chute support 54, and comprises a pair of arms 71 and 72, one extending outward from said pivotal point and the other depending therefrom. This depending arm has a catch 73, adapted to engage a projection 74, carried by the cut-off valve, while the extending arm is adapted to be engaged by an actuator, shown herein as a rod 75, one end of which is pivotally connected to the scale-beam and operable therewith, such rod projecting through and being guided by an aperture 76 in the top plate 7. From the foregoing it will be seen that on the upward movement of the scale-beam the actuator 75 will engage the extending arm 71 of the locker and actuate the same, and thereby release the cut-off valve and permit the same, together with the reducing-valves, to close, such closing action being assisted by a suitable valve-weight 46'', formed on or suitably connected to said cut-off valve 46.

To lock the receptacle against oscillatory movement during the loading period and to also lock the valve closed during the discharging period of the receptacle, suitable locking mechanism (designated generally by F) is provided, reciprocally effective to lock said valve and load-receptacle at the proper predetermined periods, and which locking mechanism is herein designated for the purposes of this specification as "duplex" locking means or mechanism, and in the preferred form thereof herein shown comprises a pair of locking members, one operable with the valve and the other with the load-receptacle. One of the members of this locking means comprises a stop 80, carried by the hub 81 of one of the cut-off-valve arms 48, and is in position to engage and be engaged by a somewhat similar stop 82, shown pivotally secured to one of the load-receptacle hangers 31. This stop 82 is connected with the load-receptacle, and for this purpose it has a projecting arm 83, pivotally secured to one end of a suitable connector, such as a lever 84, the opposite end of which is pivotally connected to the receptacle in the rear of the pivotal point of said load-receptacle with its hangers 30 and 31, whereby on the oscillatory movement of the bucket the stop 82 will be oscillated into position to lock the valve closed and to unlock the same at the proper predetermined period. Each of these stops 80 and 82 is provided with a pair of stop-faces 80' and 80" and 82' and 82", respectively, the curved stop-face 80" of the valve-stop 80 being adapted to engage the plane stop-face 82' of the receptacle-stop when the valve is open and the load-receptacle is receiving its load, thereby to lock said receptacle in its proper position against oscillatory movement. This locking action of the stop-faces 80' and 82' is also assisted by the shiftable locker 18, carried by the beam-weight 150, which maintains said weight in its effective position and thereby assists in maintaining the receiver against movement. Should this locker 18, however, be prematurely tripped, the weight could not actuate the bucket into its load-discharging position, owing to the engaging faces 80" and 82' of the stops. When the valve is closed, the stop-face 80' of the valve-stop 80 is adjacent to the curved stop-face 82" of the receptacle-stop 82, and thereby prevents the opening movement of said valve, a slight play, however, being permitted intermediate such stop-faces in this position, and which is provided for by the length of the cut-off-valve blade 47, whereby a slight opening movement of the valve can take place without opening the supply-chute.

As one means for opening the valves at the proper predetermined time an actuator operable with the load-receptacle is provided, and which actuator in the present construction comprises a projection 85, carried by said receptacle and adapted to engage a friction-roll 86, carried by the cut-off valve 46, whereby on the return of the receptacle to its normal position after discharging the load the actuator 85 engages said roll 86, opens the valve, and carries it into position to permit the locker 70 to engage and lock the same open. This actuator 85 during the movement of the bucket to discharge its load passes by the friction-roll 86, owing to the previous descent of the bucket to its position of poise by the weight of the load therein.

As a means for tripping the load-weight at the proper period, thereby to permit the oscillation of the load-receptacle and the shifting or traveling of such weight toward the beam-axis, at which point it will be in its least efficient position, suitable tripping means (designated generally by E) is provided and shown herein operated at one period by the supply mechanism through the medium of the valve mechanism, and in the construction shown this tripping means comprises a tripper 90, pivotally secured to a crank-arm 91, which is rigidly carried by one end of a short rock-shaft 92, journaled in a suitable bearing 93, depending from the under side of the top plate 7. To the opposite end of said shaft 92 is rigidly secured a lever 94, extending upwardly through a slot 95 in said top plate. The upper end of this lever 94 is pivotally secured to a connector, such as a lever 96, the opposite end of which is shown connected to the valve mechanism by means of a short arm 97, carried by the hub of one of the cut-off-valve arms 48, whereby on the closing of the cut-off valve the tripper 90 will be actuated and carried into position to have one part or arm 90' thereof engage, on the poising of the load-receptacle and the consequent ascent of the load-weight 150 with the beam, the locker 18, and thus unlock said weight and permit the traveling thereof toward the beam-axis, the locker 18 being carried into an inoperative position relatively to the tripper 90 when the weight moves toward said beam-axis. The inward movement of the weight is limited by a suitable stop 98, carried by the beam.

In the present construction of weighing apparatus suitable material-exit-operated mechanism, such as regulator mechanism, (designated generally by D,) is provided, and in the present instance one of the functions of said regulator mechanism is to control the return of the load-receptacle to its normal position. In the preferred form thereof herein shown and described this regulator mechanism comprises a regulator-blade 101, suitably secured to a rock-shaft 102, journaled in the base 2 of the framework adjacent to the rear of the bin 3, and is provided with a counterbalancing-weight 103, formed on or secured to a rearwardly-extending arm 104, likewise rigidly secured to said rock-shaft 102, whereby the regulator-blade will be held in its normal position in readiness to be actuated by the discharging material. In the present construction one of the walls, shown herein as the rear wall, of the bin or hopper 3 is open from the top to the bottom thereof, and the regulator-blade is shown as constituting the only rear wall of the bin 3 when the load-receiver is in its load-receiving position, a suitable stop 107 being provided to limit the rearward movement of said regulator-blade. When, however, the load-receiver has shifted into its load-discharging position, Fig. 6, its front wall overlaps the upper part of said regulator-blade and thereby forms at this time a part of the rear wall of said bin to prevent any material from passing out over the top of said regulator-blade.

When the load-receptacle is carried by its load into its discharging position, it is desirable to lock the same in such position and thereby insure the passage of all appreciable amount of material from the receptacle before its return, and for this purpose suitable locking mechanism (designated generally by G) is provided intermediate the receptacle and regulator, whereby the return movement of said receptacle is controlled by the regulator mechanism. This locking mechanism is shown comprising a locker or stop 105, carried by the rock-shaft 102 of the regulator-blade and shiftable with such blade into position to engage a stop or projection 106, carried by the receptacle, and thereby lock said receptacle in its discharging position until all appreciable amount of material has passed therefrom, at which time and when the regulator has returned to its normal position the locker is disengaged from the projection of the receptacle, whereby it can return into its normal position to receive another load.

From the foregoing it will be observed that on the unlocking of the receptacle after the discharge of the load it will return into position to and will receive and weigh another load. In order, however, to prevent the discharge of this next load should the material of the preceding load become clogged or wedged in the discharge-conduit 4 or for any reason all appreciable amount thereof fail to pass from the regulator-blade, suitable connecting mechanism is provided intermediate the regulator mechanism and the load-weight tripper 90, whereby such tripper will be carried out of position to engage the load-weight locker 18 on the poising of the load-receptacle with its succeeding load. In the structure shown this connecting mechanism comprises a connector 108, pivotally secured at its upper end to the other part or arm 90'' of the tripper 90 and at its lower end to a link or lever 109, rigidly secured to the outer end of the regulator rock-shaft 102, whereby it will be seen that when the discharging material engages the regulator the tripper-arm 90' will be shifted upward and retained in such position until all appreciable amount of material has passed from the regulator-blade, and hence the tripper will be held out of engagement with the load-weight locker 18 on the poising of the receptacle with its second load, whereby movement of the receptacle to discharge its load is prevented. When, however, the material has completely passed from the regulator-blade, the return of such blade to its normal position operates through the connecting mechanism to return the tripper into position to engage the load-weight locker 18, and thereby unlock the weight and permit the upsetting of the load-receptacle in the usual manner.

From the foregoing it will be seen that the tripping means is a compound tripping mechanism normally operative in one way from the supply mechanism through the valve mechanism and in another way from the discharging mechanism through the regulator mechanism, and so operative from the one independently of its operation by the other—that is to say, the tripping mechanism is operated by the valve mechanism to permit the oscillation of the load-receptacle with its proper load, thereby to discharge the same, and is operated by the regulator mechanism at the proper time to prevent the discharge of a second load before the first load has passed from such regulator and then operated by such regulator mechanism to permit the discharge of such second load—from which it will be seen that should the valve mechanism close without effecting the discharge of the load, owing to the non-passage of the material from the regulator-blade, the regulator mechanism, after such passage of material therefrom, will operate to effect such discharge, whereby such regulator mechanism constitutes both a safety means for preventing the premature discharge of a load and also supplemental means operable to secure such discharge at the proper time when not effected by the valve mechanism. It will also be seen that the receptacle cannot be tipped over to discharge its load until the cut-off valve is completely closed, as until such valve is closed the tripper is not in position to unlock the load-weight.

The operation of this weighing-machine is substantially as follows: The operative mechanisms being in the positions shown in Fig. 4, when a proper load has been secured the bucket descends to and below its position of poise, thereby raising the load-weight, and thus carrying the locker-actuator 75 into position to engage the cut-off-valve locker and shift the same to permit the closing of the cut-off valve, which simultaneously operates the reducing-valves in the manner hereinbefore set forth to reduce the supply of material. With the closing of the cut-off valve the tripper 90 is actuated to engage the load-weight locker 18 and shift the same, thereby to unlock the weight, at which time, owing to the preponderance of material in the load-receptacle at that side thereof forward of its pivotal point with the hanger mechanism, said receptacle is shifted into position to discharge its load, such movement being assisted by the traveling of the weight toward the beam-axis, owing to the inclination of the weight-supporting arm at this time, whereby it will be seen that as such weight moves toward said beam-axis it becomes less efficient, so that when in its least efficient position the weight will have comparatively little tendency to return the load-receptacle into its normal position while any appreciable portion of the load remains in the receptacle, and hence strain on the mechanism is prevented. It will be understood that on the closing of the cut-off valve the duplex locking mechanism was operated to unlock such receptacle, the valve-stop 80 having been moved upward, whereby the receptacle on its discharge movement shifted its stop into proper position below the valve-stop to lock the valve closed. On the discharge of the load the regulator is operated, whereby said bucket is locked against return movement by the regulator-locker 105 until all appreciable amount of material has passed from the load-receptacle, at which time and as the regulator commences to return into its normal position the load-receptacle is unlocked and carried into its load-receiving position by its weight 39 and the return traveling movement of the load-weight 150 into its normal position, whereby, the valves having been opened by the valve-actuator 85, carried by the load-receptacle, during such return movement of the receptacle, the second load will be weighed.

Should the material become wedged in the discharge-conduit 4, the foregoing operation takes place to permit a second load to be weighed by the load-receptacle; but the discharge thereof is prevented in the manner heretofore set forth by the regulator mechanism, which carries the tripper 90 out of position to engage the load-weight locker 18 until all appreciable amount of material has passed from the regulator-blade.

Having thus described my invention, I claim—

1. The combination of a shiftable load-receiver; pivotally-supported beam mechanism carrying said receiver and embodying traveling counterbalancing means operatively connected with said load-receiver for movement toward and from the beam-axis, thereby to assist the shifting movement of said receiver.

2. Weighing mechanism comprising a load-receiver having movements in intersecting planes; a pivotally-supported beam carrying said receiver; traveling counterbalancing means carried by said beam and movable toward and from the beam-axis; and means, independent of the beam, connecting said counterbalancing means with said load-receiver.

3. The combination of a load-receiver; pivotally-supported beam mechanism carrying said receiver and embodying counterbalancing means movable toward and from the beam-axis; and means pivotally connecting said load-receiver with said counterbalancing means.

4. The combination of a load-receiver shiftable to discharge its load; a pivotally-supported beam carrying said receiver; self-moving traveling counterbalancing means carried by said beam and movable toward and from the beam-axis during each weighing operation and automatically-operative locking means in position to lock said counterbalancing means in its efficient position after each weighing operation.

5. The combination of an oscillatory load-receiver; pivotally-supported beam mechanism carrying said receiver, and embodying a traveling weight movable toward and from the beam-axis; a connector pivotally secured to said load-receiver and to said weight; and locking means in position to lock said weight in its load-counterbalancing position.

6. The combination with weighing mechanism embodying a load-receiver having movements in intersecting planes, and traveling counterbalancing means likewise having movements in intersecting planes, said counterbalancing means being self-operative in one of its planes of movement, of means automatically operative to lock said counterbalancing means against movement in one of its said planes during a part of each weighing operation.

7. The combination of a load-receiver; pivotally-supported beam mechanism carrying said receiver, and embodying counterbalancing means movable toward and from the beam-axis; means for locking said counterbalancing means in its normal efficient position; and means for unlocking said counterbalancing means, thereby to permit the shifting thereof with said load-receiver.

8. The combination of an oscillatory load-receiver; a pivotally-supported beam carrying said receiver; a weight carried by said beam and operatively connected with the load-receiver, and movable toward and from the beam-axis on the oscillation of said load-receiver; locking means for holding said weight in its efficient position during the load-receiving period of said receiver; and means for tripping said locking means, thereby to permit said weight to travel toward and from the beam-axis.

9. The combination of a load-receiver; pivotally-supported beam mechanism carrying said receiver, and embodying traveling counterbalancing means movable toward and from the beam-axis; and load-supply means adapted to control the movement of said counterbalancing means and permit the traveling movement thereof free of connection with said load-supply means.

10. The combination of a load-receiver; pivotally-supported beam mechanism carrying said receiver, and embodying a sliding weight movable toward and from the beam-axis; and stream-controlling means operative to control the movement of said counterbalancing means and permit the traveling movement thereof free of connection with said stream-controlling means.

11. The combination of a shiftable load-receiver; pivotally-supported beam mechanism carrying said receiver, and embodying traveling counterbalancing means operatively connected with said load-receiver for movement toward and from the beam-axis; and material-supply means embodying stream-controlling means, and adapted through the medium of said stream-controlling means to control the movement of said counterbalancing means.

12. The combination of a load-receptacle; pivotally-supported beam mechanism carrying said receptacle, and embodying a traveling weight shiftable toward and from the beam-axis; locking means for holding said weight in its efficient position; valve mechanism for regulating the supply of material to said receptacle; and means operated by said valve mechanism for unlocking said weight, thereby to permit the shifting thereof independently of any movement of said valve mechanism.

13. The combination of an oscillatory load-receiver, a pivotally-supported beam carrying said receiver; a traveling weight carried by said beam; means pivotally connected to said receiver and weight, whereby said weight is movable toward and from the beam-axis on the oscillation of said receiver; means for locking said weight in its efficient position; valve mechanism for regulating the supply of material to said receiver; and tripper mechanism movable with the valve mechanism for unlocking said traveling weight, thereby to permit the same to travel toward its beam-axis.

14. In an apparatus of the class specified, the combination of a load-receiver having movements in intersecting planes; traveling counterbalancing means; and stream-controlling means operative to control the movement of said counterbalancing means and permit the traveling movement thereof free of connection with said stream-controlling means.

15. The combination of a load-receiver; pivotally-supported beam mechanism carrying said receiver, and embodying traveling counterbalancing means shiftable toward and from the beam-axis; and means operative by the discharging load to control said counterbalancing means.

16. The combination of a shiftable load-receiver; pivotally-supported beam mechanism carrying said receiver, and embodying traveling counterbalancing means shiftable toward and from the beam-axis; and regulator mechanism operable to control the traveling movement of said counterbalancing means.

17. The combination of a load-receiver; pivotally-supported beam mechanism carrying said receiver, and embodying a traveling load-weight shiftable toward and from the beam-axis; means pivotally connecting said load-receiver with said weight; and regulator mechanism operable to control the traveling movement of said weight.

18. The combination of a load-receiver; pivotally-supported beam mechanism carrying said load-receiver, and embodying a traveling weight movable toward and from the beam-axis; locking means for holding said weight in its normal counterbalancing position; and regulator mechanism adapted to unlock said weight to permit the same to move toward and from its beam-axis.

19. The combination of an oscillatory load-receiver; pivotally-supported beam mechanism carrying said receiver, and embodying a load-weight shiftable toward and from the beam-axis, a connector pivotally secured to said receiver and weight; locking means for holding said weight in its efficient position; and regulator mechanism operable to unlock said weight and thereby permit it to shift toward and from the beam-axis on the oscillation of said load-receiver.

20. The combination of a load-receiver; pivotally-supported beam mechanism carrying said receiver, and embodying traveling counterbalancing means movable toward and from the beam-axis; material-supply means operative at one predetermined period to control the traveling movement of said counterbalancing means; and means operative by the discharging load likewise to control, at another predetermined period, the traveling movement of said counterbalancing means.

21. The combination of a shiftable load-receiver; pivotally-supported beam mechanism carrying said load-receiver, and embodying sliding counterbalancing means movable toward and from the beam-axis; load-supply means operative at one predetermined period to control the traveling movement of said counterbalancing means; and regulator mechanism also operative at one predetermined period likewise to control the traveling movement of said counterbalancing means.

22. The combination, with weighing mechanism, of material-supply mechanism; regulator mechanism; and compound tripping mechanism normally operative in one way by the supply mechanism and in another way by the regulator mechanism, and so operative from the one independently of its operation by the other to effect the discharge of the load.

23. The combination, with weighing mechanism, embodying traveling counterbalancing means, of valve mechanism for controlling the supply of material thereto; regulator mechanism; and compound tripping mechanism normally operative in one way by the valve mechanism and in another way by the regulator mechanism, and so operative from the one independently of its operation by the other to control the movement of said counterbalancing means, and thereby permit the traveling thereof at the proper predetermined period to effect the discharge of the load.

24. The combination, with weighing mechanism embodying a load-receiver having movements in intersecting planes, and counterbalancing means likewise having movements in intersecting planes synchronously with said load-receiver, of stream-controlling means operative to control the supply of material to said receiver; material-discharge-operated mechanism; and means operative by said mechanism and stream-controlling means, one independently of its operation by the other, to effect the movement of said counterbalancing means, and thereby the load-receiver, in one of its said planes of movement.

25. The combination of a shiftable load-receiver; pivotally-supported beam mechanism carrying said receiver and embodying a traveling weight movable toward and from the beam-axis; locking means for locking said weight in its normal efficient position; material-supply means; material-exit-operated means; and compound tripping mechanism intermediate the material-supply means and said material-exit-operated means, and operative from the one independently of the other to unlock said weight and permit movement thereof toward the beam-axis.

26. The combination, with framework, of a shiftable load-receiver; pivotally-supported beam mechanism carrying said receiver and embodying a traveling weight movable toward and from the beam-axis; locking means for holding said weight in its normal efficient position; valve mechanism for regulating the supply of material to said load-receiver; regulator mechanism controlled by the exit of the discharged load from said receiver; a locker-tripper carried by said framework; and connecting mechanism intermediate said valve mechanism and locker-tripper, and also intermediate said regulator mechanism and locker-tripper, and operative by each at a predetermined period to unlock said weight, and thereby permit the movement thereof toward the beam-axis.

27. The combination with framework, of hanger mechanism carried thereby; a load-receiver secured to said hanger mechanism, adjacent to the lower end thereof for shiftable movement; beam mechanism supporting said hanger mechanism and embodying a traveling weight operatively connected with said receiver and movable toward and from the beam-axis to assist the shifting of said receiver.

28. The combination, with framework, of hanger mechanism carried thereby; a load-receiver pivotally secured thereto for oscillatory movement; beam mechanism pivotally supporting said hanger mechanism and embodying a traveling weight; and means pivotally secured to said weight and to said receiver, whereby the weight is shiftable toward and from the beam-axis to effect the oscillation of said receiver.

29. The combination, with framework, of hanger mechanism supported thereby; a load-receiver pivotally secured to said hanger mechanism; a pivotally-supported beam carried by said framework and supporting said hanger mechanism; a sliding weight movable toward and from the beam-axis; means connecting said weight with said load-receiver; a locker for holding said weight in its normal efficient position; a tripper carried by said framework; valve mechanism; and means intermediate the valve mechanism and tripper for unlocking said weight at one predetermined period, thereby to permit the movement thereof toward the beam-axis.

30. The combination, with framework, of hanger mechanism supported thereby; an oscillatory load-receiver pivotally secured to said hanger mechanism; a pivotally-supported beam carried by said framework and supporting said hanger mechanism; a sliding weight movable toward and from the beam-axis; means connecting said weight with said load-receiver; a locker for holding said weight in its normal efficient position; a tripper carried by said framework; regulator mechanism; and means intermediate said regulator mechanism and tripper, and adapted to unlock said weight at one predetermined period and permit the movement thereof toward the beam-axis.

31. The combination, with framework, of hanger mechanism supported thereby; a load-receiver pivotally secured to said hanger mechanism; a pivotally-supported beam carried by said framework and supporting said hanger mechanism; a shiftable weight movable toward and from the beam-axis; means connecting said weight with said load-receiver; a locker for holding said weight in its normal efficient position; a tripper carried by said framework; valve mechanism; connecting means intermediate the valve mechanism and tripper for unlocking said weight at one predetermined period to permit movement thereof toward the beam-axis; regulator mechanism; and connecting means intermediate said regulator mechanism and tripper for unlocking said weight, thereby to permit movement thereof toward the beam-axis at another predetermined period.

32. The combination of a load-receiver; a pivotally-supported beam carrying said receiver; a traveling weight mounted on said beam and movable toward and from the beam-axis; a stop rigidly secured to said beam; and a locker carried by said weight and adapted to engage said stop, thereby to lock the weight against movement.

33. The combination of an oscillatory load-receiver; a pivotally-supported beam carrying said receiver; a traveling weight mounted on said beam; a connector pivotally secured to said load-receiver and weight; a stop rigidly secured to said beam; a locker carried by said weight, and adapted to engage said stop, thereby to lock the weight against movement; and means operable to actuate the locker, thereby to unlock the weight and permit movement thereof toward and from the beam-axis.

34. The combination of a movable load-receiver; a pivotally-supported beam carrying said receiver and having a track; a traveling weight mounted on said track and operatively connected with said receiver and provided with track-rolls, one or more above, and one or more below said track, whereby said weight is movable toward and from the beam-axis to assist the movement of said receiver.

35. The combination of a shiftable load-receiver; a pivotally-supported beam carrying said receiver and having a track; a traveling weight carried by said track and provided with a plurality of track-rolls engaging said track; and a connector secured to said weight and load-receiver.

36. The combination of a load-receiver; a pivotally-supported beam carrying said receiver and having a track; a traveling weight having a series of track-rolls engaging said track; a connector secured to said weight and load-receiver; and locking means for locking said weight in its normal efficient position.

37. The combination of an oscillatory load-receiver; a pivotally-supported beam carrying said receiver and having a track; a traveling weight provided with a series of rolls engaging said track; a connector pivotally secured to said weight and load-receiver; oscillatory locking means for locking said weight in its normal efficient position; and means for tripping said locking means, thereby to unlock the weight and permit movement thereof toward and from the beam-axis.

38. The combination of a shiftable load-receiver; beam mechanism pivotally supporting said receiver and embodying traveling counterbalancing means movable toward and from the beam-axis; and connecting means secured to said counterbalancing means and pivotally secured to said receiver, the pivotal point of said connecting means with said receiver coinciding with the pivotal point of the receiver with the beam mechanism.

39. The combination, with framework, of hanger mechanism supported thereby; an oscillatory load-receiver carried by said hanger mechanism; a beam pivotally supporting said receiver; a traveling weight carried by said beam; and a connector pivotally secured to said weight and to said receiver, whereby said weight is shiftable toward and from the beam-axis to effect the oscillation of said receiver, the pivotal point of said connector with said receiver coinciding with the pivotal point of said receiver with the hanger mechanism.

40. The combination with a load-receiver, of a pivotally-supported beam carrying said receiver; traveling counterbalancing means carried by said beam and movable toward and from the beam-axis during each weighing operation; a connector, independent of the beam, connecting said load-receiver and counterbalancing means; and a cushion or buffer in position to receive the jar of said traveling counterbalancing means on the return thereof to its position of rest.

41. The combination with a load-receiver, of a pivotally-supported beam carrying said receiver; a sliding weight carried by said beam and movable toward and from the beam-axis during each weighing operation; a linkage connection between said weight and load-receiver; and a buffer or cushion in position to receive the jar of said beam on the return thereof to its position of rest.

42. In an apparatus of the class specified, material-supply means comprising a series of three valves, disposed one above another and connected together for simultaneous operation, one to completely cut off the stream of material and two to reduce said stream.

43. Material-supply means comprising a supply-chute, and a series of three valves carried thereby and operative from alternately-opposite sides of said chute and disposed one above another, and all operable simultaneously to cut off and reduce the supply-stream.

44. In a weighing apparatus, material-cut-off means comprising a pair of valves, one having a convex working face and the other a concave working face, said valves being so disposed relatively to each other that the convex face of one valve and the concave face of the other valve constitute the material-receiving faces of said valves.

45. Stream-controlling means comprising a load-cut-off valve having a concaved valve-blade constituting the material-receiving face thereof, and two load-reducing valves disposed above said cut-off valve, one above the other, and each having a convexed valve-blade constituting the material-receiving face thereof.

46. Stream-controlling means comprising a cut-off valve and a reducing-valve connected together and movable simultaneously, one of said valves being adjustable relatively to the stream-passage; and means for adjusting said valve.

47. Stream-controlling means comprising a cut-off valve and a reducing-valve connected together, said reducing-valve having an adjustment whereby the stream can be partially reduced or completely cut off, and also an adjustment whereby the volume thereof can be regulated; and means operative to secure such adjustments.

48. Stream-controlling means comprising a series of three valves disposed one above another and all connected together for simultaneous movement, one to cut off the material and two to reduce such material, and one of said valves being adjustable relatively to the stream-passage independently of the other valves.

49. Material-supply means comprising a plurality of stream-controlling valves disposed one above another, and adjustable means connecting said valves whereby one of said valves is adjustable relatively to the stream-passage, and whereby also said valves are movable simultaneously to reduce and cut off the supply-stream.

50. Material-supply means comprising a chute having a plurality of stream deflecting or break walls disposed one above another, and a plurality of stream-controlling valves likewise disposed one above another and connected together for simultaneous movement to reduce and completely cut off the stream of material.

52. Material-supply means comprising a supply-chute having a plurality of stream deflecting or break walls disposed one above another, a cut-off valve, and a plurality of reducing-valves disposed above the cut-off valve and one above another, and each reducing-valve being disposed adjacent to and below one of the stream-deflecting walls.

52. In a weighing-machine, valve mechanism comprising a cut-off valve and an adjustable reducing-valve, and adjustable means connecting said reducing-valve and cut-off valve for regulating the movement of said reducing-valve.

53. In a machine of the class specified, valve mechanism comprising a reducing-valve and a cut-off valve, adjustable means intermediate said valves and comprising a slotted member adapted to permit the adjustment of the reducing-valve thereby to regulate the volume of the stream, and a connector secured to said cut-off valve and adjustable relatively to said slotted member to regulate the throw of said reducing-valve.

54. Valve mechanism comprising a shaft supported in position for rocking movement; a load-cut-off valve having a pair of upwardly-extending arms rigidly connected to said shaft; and a load-reducing valve disposed above said cut-off valve and having a pair of depending arms rigidly connected to said shaft, said valves being disposed in position relatively to each other to operate from opposite directions simultaneously to reduce and completely cut off a stream of material.

55. Valve mechanism comprising a cut-off valve, a reducing-valve disposed above and rigidly connected to said cut-off valve, and a second reducing-valve disposed above said first reducing-valve and adjustably connected to said cut-off valve.

56. The combination of a load-receiver supported for shiftable movement; a pivotally-supported beam carrying said receiver; a traveling load-weight carried at one predetermined period adjacent to one end of said beam and movable toward and from the beam-axis to assist the shifting of said receiver; valve mechanism; and locking means intermediate said valve mechanism and receiver and adapted to lock said receiver against shiftable movement and thereby the weight against traveling movement toward the beam-axis.

57. The combination of a load-receiver supported for oscillatory movement; a pivotally-supported beam carrying said receiver; a traveling load-weight carried at one predetermined period adjacent to one end of said beam and movable toward and from the beam-axis; valve mechanism; locking means intermediate said valve mechanism and receiver, and adapted to lock said receiver against oscillatory movement; and automatically-operative locking means adapted to lock said weight against traveling movement after each weighing operation.

58. The combination of a shiftable load-receiver; pivotally-supported beam mechanism carrying said receiver, and embodying a traveling weight movable toward and from the beam-axis; valve mechanism; locking means intermediate said valve mechanism and receiver, and adapted to lock said receiver against movement; locking means adapted to lock said weight against traveling movement; and means operative by the valve mechanism for unlocking said weight-locking means.

59. The combination of a shiftable load-receptacle; pivotally-supported beam mechanism carrying said receptacle, and embodying a traveling weight movable toward and from the beam-axis; locking means for said weight; valve mechanism; duplex locking means operable to lock the valve closed when the load-receptacle is in its discharging position, and to lock said receptacle against movement when the valve is open; and means operative by the valve for unlocking said weight.

60. The combination of a shiftable load-receptacle; pivotally-supported beam mechanism carrying said receptacle, and embodying a traveling weight movable toward and from the beam-axis; locking means for said weight; valve mechanism; duplex locking means operable to lock the valve closed when the receptacle is in its discharging position, and to lock said receptacle against movement when the valve is open; and regulator mechanism operative to unlock said weight.

61. The combination of an oscillatory load-receptacle; pivotally-supported beam mechanism carrying said receptacle and embodying a traveling weight movable toward and from the beam-axis; locking means for said weight; valve mechanism; duplex locking means operable to lock the valve closed when the load-receptacle is in its discharging position, and to lock said receptacle against movement when the valve is open; means operative with the valve for unlocking said weight; and regulator mechanism also operative to unlock said weight.

62. The combination with hanger mechanism, of a shiftable load-receptacle carried by said hanger mechanism; valve mechanism for regulating the supply of material to said load-receptacle; and duplex locking means comprising a stop operative with the valve mechanism and a stop shiftably secured to the hanger mechanism and permanently connected to said load-receptacle for movement therewith and operative to engage the valve-stop, thereby to maintain the load - receptacle against shiftable movement.

63. The combination, with framework, of hanger mechanism carried thereby; an oscillatory load-receptacle pivotally secured to said hanger mechanism; valve mechanism for regulating the supply of material to said receptacle; duplex locking means, comprising a stop operative with the valve mechanism and a stop pivotally secured to said hanger mechanism, and a connector pivotally connecting said last-mentioned stop with the load-receptacle, the pivotal point of said connector with said receptacle being in the rear of the pivotal point of said receptacle with said hanger mechanism.

64. The combination with a load-receiver shiftable to discharge a load, of a beam supporting said receiver; a traveling counterbalancing means carried by said beam and movable toward the beam-axis to assist the load-receiver into its load-discharging position; a linkage connection between said receiver and counterbalancing means, whereby said counterbalancing means is movable simultaneously with said load-receiver; and regulator mechanism operative to lock said load-receiver in its load-discharging position and thereby maintain said weight in its inefficient position.

65. The combination of a load - receiver; pivotally-supported beam mechanism carrying said receiver, and embodying traveling counterbalancing means movable toward and from the beam-axis; locking means for holding said counterbalancing means in its normal efficient position; valve mechanism for regulating the supply of material to said load-receiver; regulator mechanism controlled by the exit of the discharging load from said receiver, and adapted to lock said load-receiver in its load-discharging position; and compound tripping mechanism intermediate said valve mechanism and regulator mechanism, and operative by each independently of the other, at a predetermined period, to unlock said counterbalancing means and thereby permit the movement thereof toward the beam-axis, to effect the discharge of the load.

66. The combination, with framework, of weighing mechanism supported thereby, and embodying a load-receptacle and a traveling counterbalancing-weight movable toward and from said receptacle; locking means carried by said weight for locking the same in its normal efficient position; and means carried by said framework for unlocking said weight to permit movement thereof toward and from said receptacle.

67. In a machine of the class specified, the combination of a beam; a traveling load-weight carried at one predetermined period adjacent to one end of said beam and automatically shiftable during each weighing operation; and self-operative locking means operative during the loading period to maintain said weight in its load-counterbalancing position.

68. The combination of beam mechanism having a traveling weight automatically shiftable during each weighing operation; and locking means carried by the weight and operative to hold said weight in its effective position.

69. Stream-controlling means comprising a reducing-valve; a cut-off valve movable simultaneously with said reducing-valve; and a pair of connectors between said valves, and secured, one to each valve, and also having an engagement with each other, whereby said valves are movable together, one to reduce and the other to completely cut off the stream of material.

70. The combination of an upsettable load-receiver; a pivotally-supported beam carrying said upsettable load-receiver; a self-movable, sliding weight carried by said beam; a linkage connection between said weight and the load-receiver, whereby, simultaneously with the upsetting of said receiver, the weight is movable toward the beam-axis; and a spring-controlled buffer or cushion in position to receive the jar of said beam and weight on the return thereof to their positions of rest, whereby said buffer takes up the jar of the beam and weight, and owing to such linkage connection also that of the load-receiver as it returns to its position of rest.

FRANCIS H. RICHARDS.

Witnesses:
C. A. WEED,
EDWARD A. MEAD.